US009932960B2

(12) United States Patent
Petsche et al.

(10) Patent No.: US 9,932,960 B2
(45) Date of Patent: Apr. 3, 2018

(54) ROTOR BLADE OF A WIND TURBINE

(71) Applicant: SENVION GMBH, Hamburg (DE)

(72) Inventors: Marc Petsche, Nübbel (DE); Christoph Matthias Korjahn, Ahlefeld-Bistensee (DE)

(73) Assignee: Senvion GmbH, Hamburg (DE)

( * ) Notice: Subject to any disclaimer, the term of this patent is extended or adjusted under 35 U.S.C. 154(b) by 294 days.

(21) Appl. No.: 14/829,316

(22) Filed: Aug. 18, 2015

(65) Prior Publication Data

US 2015/0361952 A1    Dec. 17, 2015

Related U.S. Application Data

(63) Continuation of application No. PCT/EP2014/000381, filed on Feb. 12, 2014.

(30) Foreign Application Priority Data

Feb. 19, 2013    (DE) .................. 10 2013 202 666

(51) Int. Cl.
*F03D 1/06* (2006.01)

(52) U.S. Cl.
CPC ......... *F03D 1/0633* (2013.01); *F03D 1/0683* (2013.01); *F05B 2240/301* (2013.01); *F05B 2240/32* (2013.01); *Y02E 10/721* (2013.01)

(58) Field of Classification Search
CPC .............. F03D 1/0633; F03D 1/0683; F05B 2240/301; F05B 2240/32; Y02E 10/721
See application file for complete search history.

(56) References Cited

U.S. PATENT DOCUMENTS

| 8,226,368 B2 * | 7/2012 | Standish | ................... F01D 5/14 416/233 |
| 2011/0142664 A1 | 6/2011 | Anjuri et al. | |
| 2011/0262281 A1 * | 10/2011 | Petsche | ................ F03D 1/0641 416/223 R |

FOREIGN PATENT DOCUMENTS

| DE | 102008003411 A1 | 7/2008 | |
| DE | 102008052858 A1 | 4/2010 | |
| EP | 1944505 B1 | 11/2012 | |
| WO | 90/11929 A1 | 10/1990 | |
| WO | WO 2013014080 A2 * | 1/2013 | ........... F03D 7/0244 |

OTHER PUBLICATIONS

International Search Report dated Apr. 23, 2014 in corresponding International Patent Application No. PCT/EP2014/000381.
(Continued)

*Primary Examiner* — Richard Edgar
(74) *Attorney, Agent, or Firm* — Rankin, Hill & Clark LLP

(57) ABSTRACT

A rotor blade (5) of a wind turbine, which has a profile (1-4) having an upper side (suction side) (7) and an underside (pressure side) (8). The profile (1-4) includes a camber line (21, 25) and a chord (18) between a leading edge (10) and a trailing edge (11) of the profile (1-4). The profile (1-4) has a relative profile thickness of more than 45%. At least one vortex generator (50, 50', 50", 50''') is disposed, in the region of the profile (1-4), on the suction side (7) of the rotor blade (5). The profile (1-4) is provided with a blunt trailing edge. And, The thickness of the trailing edge is between 15% and 70% of the chord length.

14 Claims, 8 Drawing Sheets

(56) References Cited

OTHER PUBLICATIONS

"Niedriggeschwindigkeitsprofile", pp. 162-163, Dieter Althaus, Friedr. Vieweg & Sohn Verlagsgesellschaft mbH, Braunschweig/Wiesbaden, 1996.
"Windkraftanlagen", p. 126 f., Erich Hau, 4. Auflage, 2008.
"Fluid-dynamic lift", Information on Lift and its Derivatives, in Air and in Water, presented by Dr.-Ing. S. F. Hoerner, 1985, pp. 5-12 and 5-13, 6-2 and 6-3, Hoerner Fluid Dynamics, Bakersfield, CA 93390.
"Niedriggeschwindigkeitsprofile", pp. 552-553, Dieter Althaus, Friedr. Vieweg & Sohn Verlagsgesellschaft mbH, Braunschweig/Wiesbaden, 1996.

* cited by examiner

ROTOR BLADE OF A WIND TURBINE

CROSS-REFERENCE TO RELATED APPLICATIONS

This application is a continuation of International Application Number PCT/EP2014/000381, filed Feb. 12, 2014, and claims priority to DE 102013202666.8, filed Feb. 19, 2013.

BACKGROUND OF INVENTION

Field of Invention

The invention relates to a rotor blade of a wind turbine, having a profile that has a suction side and a pressure side, wherein the profile comprises a camber line and a chord between a leading edge and a trailing edge of the profile, wherein the camber line extends at least portionally beneath the chord, in the direction of the pressure side, and wherein the profile has a relative profile thickness of more than 45%.

Brief Description of Related Art

Known from DE 10 2008 003 411 A1 are a rotor blade of a wind turbine and a corresponding family, or a plurality, of profiles. The airfoil profiles, or profiles, disclosed in this document have a blunt trailing edge, a substantially oval suction side and a substantially S-shaped pressure side.

Other profiles are also known. In particular, there are known low-speed profiles, which are used in proximity to the rotor-blade root, or in proximity to the hub of the wind turbine.

A profile of large relative thickness, known from Dieter Althaus "Niedriggeschwindigkeitsprofile", Friedr. Vieweg & Sohn Verlagsgesellschaft mbH, Braunschweig/Wiesbaden, 1996, is produced in that a profile of small relative thickness, known per se, is brought to the required relative thickness values that are needed in the proximity of the blade root by truncating the trailing edge, or by scaling-up the thickness. An example that may be cited in connection with this is that of FX 77-W-500, which is disclosed on pages 162 to 163 of the book mentioned. This profile, in the clean state, in the case of a Reynolds number of 2.75 million, achieves a maximum lift coefficient of cl=1.6 with an angle of attack of 10°, and in the dirty, i.e. turbulent, state, achieves a maximum cl of 0.8 with an angle of attack of 4°. The FX 77-W-500 has a relative profile thickness of 50%.

In the context of the invention, an angle of attack, or angle of incident flow, is an angle of the incident apparent wind in relation to the chord of the profile. For any definitions, reference is to be made, in particular to the textbook: Erich Hau, "Windkraftanlagen", Fourth Edition, 2008, in particular page 126 ff.

Although known profiles having a large relative profile thickness, such as, for example, the FX 77-W-500, do have an acceptable lift coefficient cl in the clean state, nevertheless in the case of turbulent circumfluent flow, i.e. in the dirty state, the maximum lift coefficient collapses significantly. In addition, the aerodynamic angle of attack at which the maximum lift coefficient is attained in the dirty state changes significantly in comparison with the angle of attack at which the maximum lift coefficient is attained in the clean state. This behavior, namely, the small amount of lift in the dirty state with a large change in the angle of attack for the maximum lift coefficient, is highly unfavorable for wind turbines. If, because the blade depths are to be kept small, the angle at which the clean profile has the maximum appropriate lift coefficient, or a lesser angle, is selected as the design angle of attack, i.e. the angle of attack that is used, in the design of the rotor blade, for calculating the respective profile, the lift coefficient in the dirty state then diminishes to a fraction of the clean value. Owing to the thick trailing edge, the profile of the FX 83-W-500 has only moderate aerodynamic properties even in the case of laminar circumfluent flow. In the case of turbulent circumfluent flow, it still has high lift coefficients, but then has relatively poor lift/drag ratios. Moreover, the maximum thickness of this profile is approximately 80% of the profile length, or chord length, which structurally does little to provide the rotor blade with a good body contour. Consequently, in the case of a blade having the profile of the FX 83-W-500, only a relatively small spacing of the main girders can be established, and this results in corresponding curtailments in respect of the constructability and blade weight of a rotor blade.

EP 1 944 505 B1 discloses a wind-turbine rotor blade having a profile that has a suction side and a pressure side, wherein the profile comprises an inner profile portion and an outer profile portion, wherein the inner profile portion is comparatively thicker than the outer profile portion, wherein the thickness of the inner profile portion is between 30% and 80% of the chord length of the inner profile portion, and the inner profile portion is provided with eddy generators, wherein the eddy generators are disposed, on the suction side of the inner profile portion, at between 8% and 12% of the chord length, as measured out from the leading edge of the profile portion. This is intended to achieve an adequate aerodynamic capability with, at the same time, a high structural stability.

The applicant's document DE 10 2008 052 858 A1 discloses particular profiles of a rotor blade, and a corresponding rotor blade of a wind turbine, in which the profiles provide very good aerodynamic properties. In particular, the profiles are relatively thick, and have a high lift coefficient. In order to achieve even higher lift coefficients for rotor blades of wind turbines, it might be possible to implement a measure used in the case of airfoils of aircraft. Thus, for example, the publication "Fluid-dynamic lift", Information on Lift and its Derivatives, in Air and in Water, presented by Dr.-Ing. S. F. Hoerner 1985, pages 5-12 and 5-13, and also 6-2 and 6-3, Hoerner Fluid Dynamics, Bakersfield, Calif. 93390, disclose very high lift coefficients. In this case, high lift coefficients, of up to over 3.0, are achieved by the provision of flaps, in particular slotted flaps, adjoining the airfoil, and of flaps, in particular slotted flaps, projecting from the airfoil, which in each case are spaced apart from the actual airfoil.

It is the object of the present invention to specify a rotor blade of a wind turbine that has a very large lift, while having good aerodynamic properties.

BRIEF SUMMARY OF THE INVENTION

This object is achieved by a rotor blade of a wind turbine, having a profile that has a suction side and a pressure side, wherein the profile comprises a camber line and a chord between a leading edge and a trailing edge of the profile, wherein the profile has a relative profile thickness of more than 45%, wherein at least one vortex generator is disposed, in a region of the profile, on the suction side of the rotor blade, wherein the trailing edge of the profile is blunt, and wherein the thickness of the trailing edge is between 15% and 70% of the chord length.

Unexpectedly, by provision of a rotor blade according to the invention, having a profile optimized in respect of aerodynamics and having correspondingly good aerodynamic properties, in particular a high lift coefficient, and additionally with the use of at least one vortex generator, which, in particular, may also be referred to as an eddy generator, extremely high lift coefficients, of over 3.0, with corresponding large angles of attack, were achieved, without use of the above-mentioned technology (slotted flaps) known from aircraft construction. Also, unexpectedly, the lift/drag ratio improves, despite the greater drag achieved because of the vortex generators. For example, the lift/drag ratio increases by up to 100%.

Preferably, the camber line extends at least portionally beneath the chord, in the direction of the pressure side. Preferably, the profile has a relative profile thickness of more than 49%.

The rotor blade according to the invention makes it possible to realize a rotor blade that is highly insusceptible to turbulence and that, by allowing greater possible aerodynamic angles of attack, reduces a rotor-blade twist at the rotor-blade root that is unfavorable in respect of production engineering, thereby, in turn, making it possible to achieve improved structural compatibility in that a less twisted rotor-blade girder is provided.

In particular, the invention makes it possible, while still having good lift/drag ratios of the rotor blade, or of the corresponding rotor-blade portions of great thickness, to significantly increase the lift of the rotor blade in this portion.

Through use of the corresponding profiles, having vortex generators, in the case of corresponding rotor blades according to the invention, the weight, and therefore the static moment, of the rotor blade can be reduced considerably in comparison with conventional designs. Since, in the case of rotor blades of more than 50 m, the static moment is the principal limiting variable for the design, the invention can be used to increase the maximally possible rotor diameter for a given static moment, while maintaining a high rotor efficiency. This results in a considerable increase in yield in the case of correspondingly given and dimensioned blade connection designs. In particular, no multiple-slot flaps such as, for example, Fowler flaps, known in aircraft engineering, are used in this case.

Preferably, the vortex generator, or the at least one vortex generator, is disposed in front of, or immediately in, the separation point of the air flow for a predefined angle of attack. The at least one vortex generator is preferably a type of fin, or pair of fins, that projects substantially orthogonally out of the surface of the rotor blade and generates an eddy in the air flow. This results in mixing of the boundary layer at the surface of the rotor blade, such that a greater lift is generated.

The boundary layer is preferably a layer of air, around the rotor blade or on the rotor blade, that is influenced by the friction of the air on the rotor blade, i.e. that is slower than the ambient air speed. Owing to the eddy, or eddies, generated by the at least one vortex generator, high-energy flow, i.e. flow at high velocity, is transported from outside into the region of the flow that is decelerated by the friction on the wall of the rotor blade, thereby thoroughly mixing the boundary layer. As a result, the boundary layer remains stable for longer, and the flow separation is shifted in the direction of the trailing edge of the rotor blade, or toward greater angles of attack. As a result, an improved flow around the rotor blade is achieved. Preferably, the position of the at least one vortex generator is just in front of, or in, the separation position of a corresponding profile without a vortex generator, in the case of the desired angle of attack.

Preferably, a profile having a blunt trailing edge is provided, wherein the thickness of the trailing edge is between 15% and 70% of the chord length. This makes it possible to achieve a particularly high lift coefficient. In particular, the lift/drag ratios of the profiles are also increased by the provision of vortex generators. For example, in the case of a profile having a position of maximum thickness at 50%, the provision of vortex generators results in the lift/drag ratio being increased from 17 to 32. This corresponds to an increase of 88%. In the case of a profile having a thickness of 70%, the provision of vortex generators results in the lift/drag ratio being increased from 7 to 10, which corresponds to an increase of 43%.

Preferably, the at least one vortex generator is disposed in a range of from 5% to 40%, in particular from 19% to 30%, in particular from 20% to 28%, of the profile depth of the profile, or of the chord length. These stated ranges are understood to be measured from the leading edge of the rotor blade. A particularly large amount of lift can be achieved as a result.

If, preferably, the at least one vortex generator comprises a pair of fins, wherein, in particular, the fins of the pair of fins are disposed at an angle, in relation to each other, that is in a range of from 10° to 50°, in particular 20° to 40°, in particular is 30°, this generates air eddies in mutually opposite directions, resulting in a high-energy boundary layer and thereby rendering possible an enduring flow, even in the case of large angles of attack. The angle in this case is, in particular, an angle in a plane parallel to the surface of the rotor blade. This means, in particular, the angle between the two faces of the respective fins of the pair of fins. Thus, for example, this is twice the angle $\beta$ according to FIG. 11, which is to be described in the following.

Preferably, the at least one vortex generator is disposed in the region of the rotor blade that is close to the hub.

Preferably, the vortex generator is of a height, at most, that corresponds to the height of an air boundary layer, on the suction side of the rotor blade, that forms when the rotor blade is in operation, wherein the air boundary layer is defined in that the air speed in the air boundary layer is reduced by at least 1% as a result of friction on the rotor-blade surface of the suction side.

Preferably, a plurality of vortex generators are provided, which are disposed next to each other, substantially parallel to a longitudinal axis of the rotor blade. Next to each other in this case means next to each other in the direction of incident flow. This design gives the rotor blade a very high lift coefficient, in particular in the case of the correspondingly thick profiles (45% and more of the chord length). The vortex generators may also be disposed even further toward the tip of the rotor blade, in particular also in the case of rotor-blade profiles of a relative thickness of less than 45%.

Preferably, the plurality of vortex generators, in particular all vortex generators, are disposed at a relative profile depth of 20% to 40% as viewed from the leading edge.

In the case of the rotor blade according to the invention, the measure according to the invention makes it possible to select a large angle of attack, at the same time achieving a high lift coefficient and a high lift/drag ratio. As a result, the twist of a rotor blade provided with such a profile, or of a rotor blade provided with a family or multiplicity of profiles, can be kept small, such that it is possible to achieve a spacing of the main girders that is as great as possible, and the weight of the rotor blade is therefore reduced.

Preferably, the camber line is disposed at a distance of between 0% and 60%, in particular between 0% and 50%, of the profile depth of the profile beneath the chord. This makes it possible to achieve a profile having very good aerodynamic properties for a wind turbine.

If, preferably, the camber line is disposed entirely in a portion at between 5% and 50%, in particular between 2% and 60%, beneath the chord, designing the profile to even lower Reynolds numbers is relatively unproblematic.

Preferably, the amount of the maximum camber is less than 0.015, 1.5%. The camber in this case is the distance of the camber line in relation to the chord, as a percentage of the chord length. For the given profile, therefore, the maximum camber is the greatest distance of the camber line in relation to the chord, as a percentage of the chord length. In the context of the invention, the camber line is the line of the mid-points of the circles inscribed between the upper side and underside of the profile. In the context of the invention, the chord is defined as the line from the center of the trailing edge of the profile to the farthest profile point, this corresponding to the nose point. In the context of the invention, the camber line curvature is defined as the second derivative of the function of the camber line. The maximum profile thickness, also called the relative profile thickness in the context of the invention, is the maximum thickness of a profile perpendicular to the chord, relative to the chord length. In the context of the invention, the relative position of maximum thickness is defined as the distance of the maximum profile thickness from the front nose point, relative to the chord length, and is thus also stated as a percentage. The thickness of the trailing edge is defined, in the context of the invention, as the thickness of the trailing edge, relative to the chord length.

Preferably, the second derivative of the camber line (camber line curvature) is either 0 or positive from 10% to 40%, in particular from 5% to 50%, in particular from 2% to 60%, of the profile depth. This profile has its own inventive subject-matter.

A profile of a rotor blade according to the invention has particularly good aerodynamic properties if the profile has a relative profile thickness of more than 49%, in particular more than 55% or equal to 55%, wherein the position of maximum thickness is at less than 35%. This profile is suitable, in particular, for profiles at the rotor-blade root side.

The aerodynamic properties of the rotor blade according to the invention are particularly good, in particular, in that the respective profile has a blunt trailing edge, wherein the thickness of the blunt trailing edge, or the relative trailing-edge thickness, has in a range, or in an order of magnitude, of from 15% to 70% of the chord length of the profile at this location. Particularly preferred is a trailing-edge thickness of from 20% to 60%, in particular from 25% to 50%, in particular from 30% to 45%, in particular 35% to 40%, of the chord length in each case. Other ranges may also be preferred. Owing to the blunt trailing edge, the high lift coefficients are achieved in a particularly efficient manner.

Particularly preferred is a profile of a rotor blade according to the invention if the latter, on the suction side, toward the trailing edge, has an S shape, or concave shape, i.e. is cambered inward, thus cambered toward the chord. Preferably, a corresponding concave camber is provided on the pressure side, toward the trailing edge. The concave camber toward the trailing edge is preferably more pronounced on the pressure side than on the suction side. Preferably, the concave camber on the suction side begins only from 60% of the chord length, measured from the leading edge of the profile. Preferably, the transition from the suction side, or from the pressure side, to the trailing edge of the profile is as sharp as possible. In the case of a blade depth, or chord length, of 2 m-5.5 m, a transition radius of less than 10 mm, in particular preferably less than 7 mm, in particular preferably less than 5 mm, is provided.

Preferably, the rotor blade has a profile that has a relative profile thickness of more than 45%, in particular more than 50% or equal to 50%, wherein a lift/drag ratio of greater than 6, in particular greater than 10, in particular greater than 15, is attained in the case of turbulent circumfluent flow. With use of this profile in the region of the rotor blade near the blade root, the energy contained in the incident flow is efficiently exploited despite the high relative profile thicknesses of more than 45%, even without extreme blade depth. This effect is also achieved to the greatest extent possible with dirty profiles, thus in the case of completely turbulent flow around the profiles. Moreover, the aforementioned profiles for the rotor blade according to the invention, and also the following profiles, have been developed in that the working region lies at large aerodynamic angles of attack, for example >10°. As a result, a large geometric blade twist, which is unfavorable in respect of production engineering, is avoided. Preferably, the relative profile thickness is greater than 49%, in particular greater than or equal to 56%.

A particularly preferred profile of a rotor blade, having a vortex generator, of a wind turbine is characterized in that the profile has a relative profile thickness of more than 45%, with a position of maximum thickness at less than 50%, wherein a lift coefficient of greater than 1.8, in particular greater than 2.8, is achieved in the case of turbulent circumfluent flow.

Preferably, the relative profile thickness of the rotor blade is more than 65%, in particular greater than or equal to 70%. Preferably, the lift coefficients are achieved with design angles of incident flow, or angles of attack, of from 12° to 30°, in particular 16° to 24°.

A further particularly preferred rotor blade has a profile having a nose radius that is greater than 18% of the profile depth, wherein the profile is asymmetrical in the nose region.

Preferably, a ratio of the maximum lift coefficient in the case of turbulent circumfluent flow, to the maximum lift coefficient in the case of laminar circumfluent flow, of more than 0.75 to 1.0 is achieved.

Preferably, the suction side and the pressure side of the profile of the rotor blade each have a concave contour, at least portionally, in the rear region. Due to this, significantly lesser overspeeds occur on the suction side, while a significant proportion of the total lift of the profile is generated on the pressure side, by a so-called "rear loading".

Preferably, a plurality of differing profiles are provided in the rotor blade, which are realized in at least one region of a rotor blade of a wind turbine, and which behave harmoniously in relation to each other. A harmonious behavior is understood to mean, in particular, a continuous shape, in particular a derivative without discontinuity.

In the context of the invention, a turbulent flow, or profile circumfluent flow, is then considered as present when the aerodynamically cleanly defined transition of the flow from laminar to turbulent is present. A turbulent circumfluent flow, in the context of the invention, is in particular a flow state, at which more than 90%, in particular more than 92%, of the surface has a turbulent boundary layer. This is simulated experimentally, and also in the case of the measurements presented in the following, through roughnesses that are just large enough to bring about a transition from a laminar boundary layer to a turbulent boundary layer. For this purpose, an indented band, for example, is realized on the suction side at 5% from the nose point, and on the pressure side at 10% from the nose point, sometimes also at 5% (suction side) and 5% (pressure side), or 3%/5%, or 3%/3%. In this case, the exact location of the indented band depends on the nose radius and on the angle of attack to be measured.

An advantage of the rotor blade according to the invention lies in the high lift coefficients, both in the clean and in the dirty state, i.e. in the case of both laminar and turbulent flow. A further advantage lies in that the operating points of the rotor blade according to the invention are located, close to the rotor-blade root, at large aerodynamic angles of attack, as a result of which the geometric twist of the entire rotor blade can be significantly reduced, which is a great advantage in production and also results in lower rotor blade weights. It may also be the case that the maximum blade twist is fixed by production techniques, such that the profiles of the rotor blade in the proximity of the blade root, in combination with the vortex generator or the vortex generators, which are disposed in the region of this profile, or these profiles, enable these still to be used at the optimal operating point, with very high lift coefficients, which is not possible in the region in the proximity of the rotor blade root in the case of the rotor blades known hitherto. Thus, in the case of the profiles used, angles of attack at which an optimal lift is generated can prevail with known profiles in the blade tip, and simultaneously other angles of attack that, for the profiles there, still generate an optimal, or at least still acceptable, lift, can prevail in the proximity of the blade root.

A further advantage lies in that the position of maximum thickness is exactly designed for a good body contour within the rotor blade. This renders possible a maximum main girder spacing in the region of relative profile thicknesses of 35% up to the cylinder (at the rotor-blade root), with the least possible curvatures in the leading-edge girder and trailing-edge girder.

Particularly advantageously, the maximum profile thickness and/or the relatively large nose radius are located comparatively far forward.

All stated features, including those taken from the drawings alone, as well as individual features that are disclosed in combination with other features, are considered to be material to the invention, singly and in combination.

Particularly preferred and advantageous is a trailing edge thickness of 26% of the chord length in the case of a profile having a thickness of 50%. In connection with this, reference is to be made, in particular, to the following figures, in which exemplary embodiments for profiles according to the invention are specified. Accordingly, it is particularly advantageous if the trailing edge thickness is approximately 50% of the chord length in the case of a profile having a thickness of 70%. In connection with this, likewise, reference is to be made, in particular, to the figures.

According to the invention and particularly preferred is a rotor blade of a wind turbine, having a profile that has an upper side (suction side) and an underside (pressure side), wherein the profile comprises a camber line and a chord between the leading edge and the trailing edge of the profile, wherein the camber line extends at least portionally beneath the chord, in the direction of the pressure side, and wherein the profile has a relative profile thickness of more than 45%, in particular more than 49%, in particular more than 69%, wherein at least one vortex generator is disposed, in the region of the profile, on the suction side of the rotor blade, preferably at between 20% and 40% of the profile depth, i.e. as viewed from the leading edge. Moreover, preferably provided in this case is an S-shaped camber line having a negative camber in the front region of the profile, i.e. toward the leading edge, and a positive camber in the rear region of the profile. In addition, there is preferably provided an S-shaped pressure side, which is convex in the front region of the profile and concave in the rear region. Further, there is preferably provided an S-shaped suction side, which is convex in the front region and concave in the rear region. These embodiments of a rotor blade according to the invention, having corresponding profiles, are particularly preferably provided with vortex generators, which are triangular in outline, or vertical section. These are preferably and advantageously disposed in opposite directions in pairs, such that eddies rotating in opposite directions are generated. Particularly preferably, the vortex generators are of a height that is less than or equal to the local boundary layer thickness. Moreover, the vortex generators are preferably disposed at between 15% and 45% of the chord length, measured from the leading edge of the profile, and particularly preferably at between 20% and 40% of the profile depth.

Preferably, the profile of the rotor blade has a blunt trailing edge, wherein the thickness of the trailing edge may vary according to the thickness of the profile. The following feature combinations are particularly preferred in this case. A profile having a thickness of more than 45% preferably has a trailing-edge thickness of more than 15% and corresponding vortex generators. A profile having a thickness of more than 49% preferably has a trailing-edge thickness of more than 20%, and corresponding vortex generators are provided. A further profile, having a thickness of more than 69%, has a trailing-edge thickness of preferably more than 45%. Correspondingly, vortex generators are also provided.

These aforementioned profiles preferably have an S-shaped camber line, having a negative camber in the front region of the profile and a positive camber in the rear region of the profile.

Moreover, it may preferably be provided that these profiles have an S-shaped pressure side, which is convex at the front and concave at the rear. In addition, preferably, a profile having a 45% thickness may be provided, wherein a trailing-edge thickness of more than 15% is then provided. Additionally provided are vortex generators and an S-shaped pressure side, which is convex in the front region and concave in the rear region. Preferably provided, moreover, is a profile having a thickness of more than 49%, having a trailing-edge thickness of more than 20% and corresponding vortex generators, in the case of a rotor blade having a corresponding profile. Provided in this case is an S-shaped pressure side, which is convex in the front region and concave in the rear region. Also preferably provided is a profile having a thickness of more than 69%, having a trailing-edge thickness of more than 45% and a corresponding vortex generator, wherein an S-shaped pressure side, which is convex at the front and concave at the rear, is provided.

If, in the context of the invention, it is stated that a profile is provided with vortex generators, this means that a vortex generator is disposed on a rotor blade, in the region at which this profile is provided. The vortex generators are preferably disposed, particularly preferred in the case of the previous example, at between 20% and 40% of the chord, as viewed from the leading edge.

Other combinations of features are also possible within the scope of the invention.

BRIEF DESCRIPTION OF THE DRAWINGS

The invention is described in the following, without limitation of the general concept of the invention, on the basis of exemplary embodiments and with reference to the drawings, wherein reference is expressly made to the drawings in respect of all details according to the invention that are not explained more fully in the text. There are shown in:

FIG. 1, which is a schematic representation of a rotor blade according to the invention, with profiles drawn in;

In the drawings, elements and/or parts that are the same or of the same type are in each case denoted by the same reference numerals, such that in each case they are not presented anew.

DETAILED DESCRIPTION OF THE INVENTION

Figure 1:
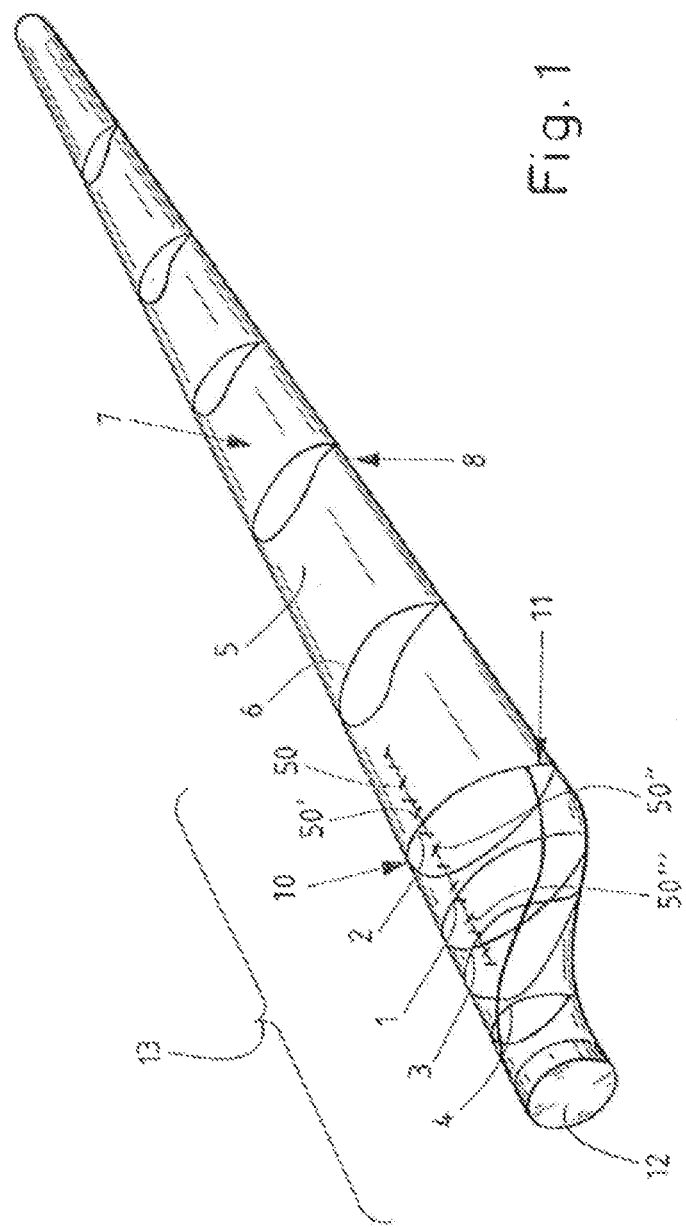

Shown schematically in FIG. 1 is a rotor blade 5 of a wind turbine, the latter not being represented, wherein some profiles 1-4 and 6 have already been drawn in.

Profiles 1-4 are provided in a transition region 13 in the proximity of a rotor-blade root 12. The transition region 13 may be distinguished in that, for example, the trailing edge 11 no longer tapers, as in the case of the other profiles 6, but is blunt in form, for example becoming ever more blunt, the closer the profiles are to the rotor-blade root 12. To aid illustration, the leading edge 10 is also indicated, as well as an upper side, or suction side 7, and an underside, or pressure side 8. Of particular interest in the context of the invention are the profiles 1-4, which are located in the transition region 13, as well as additionally provided vortex generators 50, 50', 50" and 50'". These profiles 1-4 are now to be explained in the following.

Figure 2:
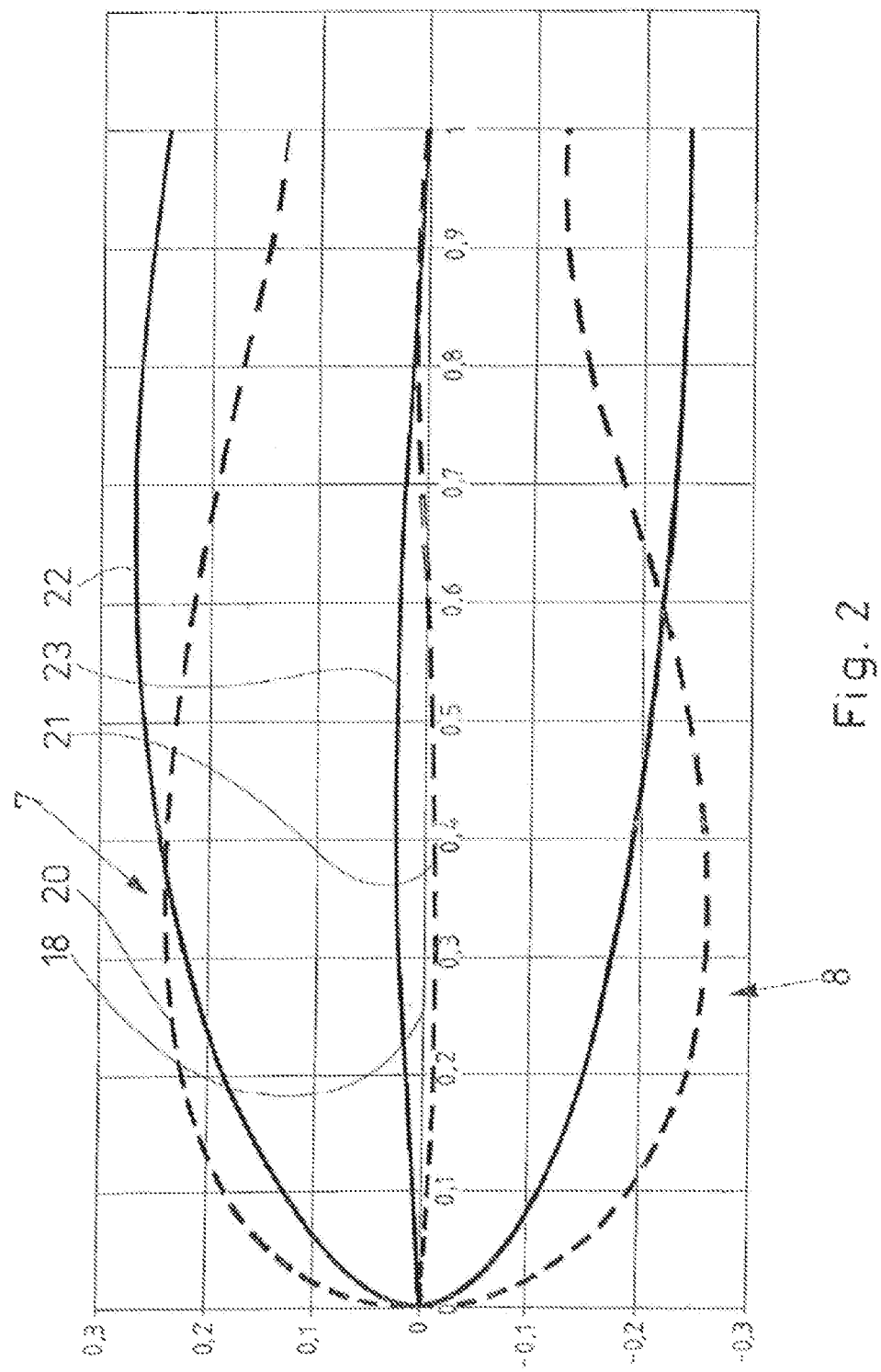
FIG. 2, which is a profile of a rotor blade according to the invention in comparison with a profile of the prior art.

FIG. 2 shows a profile of a rotor blade 5 according to the invention without a vortex generator in comparison with a profile of the prior art. The profile 20, which has the designation RE-W-50-B6, has a camber line 21 that, in the front profile region, to 60%, or 0.6, of the chord length, is curved toward the pressure side 8. It is only at approximately 0.63 of the chord length that the camber line 21 intersects the chord 18 and goes in the direction of the suction side 7. Moreover, in comparison with the profile FX 83-W-500 (see Althaus, loc.cit., pages 552, 553), which is denoted by the reference numeral 22, the maximum profile thickness is relatively far forward. In the case of the profile 20, this is located at 34.4%, or 0.344, of the profile depth, or chord length. The known profiles cited in the above-mentioned document by Althaus have positions of maximum thickness at 37.4% to 78.7%.

Also the nose radius of the profile 20, with 23.3% of the profile depth, is significantly larger than the comparison profiles, which have values of between 5.6% and 14.8%, wherein it must be taken into account here that the profile is also asymmetrical in the region of the nose. The comparison profile 22, namely, the FX 83-W-500, also has a camber line 23 that is disposed entirely above the chord 18, toward the suction side 7. The relative profile thickness of the profile 22 is 50%. This is located at a profile depth of 78.7%. There is a maximum camber of 2.539% with a profile depth of 52.7%. The nose radius is 5.6%. There is a profile cross-sectional area of 0.4134, and a trailing-edge thickness of 47.9%. The profile 20 according to the invention has a relative profile thickness of 50% at a profile depth of 34.4% and a maximum camber of 1.23%. The maximum camber is located at a profile depth of 82.5%. The nose radius is 23.3%, the profile cross-sectional area is 0.3927, and the trailing-edge thickness is 25.7%. It can be seen that, particularly on the pressure side 8, in the rear region of the profile, the profile has a concave contour. This is also the case on the suction side 7, but not as pronounced as on the pressure side 8. By contrast, the contour of the profile 22 according to the prior art is convex in the rear region.

In addition, the profile for the rotor blade according to the invention has a blunt trailing edge 11, which has an extent of approximately 23% to 25%, in particular 23.7%, of the chord length.

FIG. 3 again shows a profile of a rotor blade 5 according to the invention, but without a vortex generator, namely, the profile RE-W-70-B9 (reference numeral 24), in comparison with a profile of the prior art, namely, the profile FX 79-W-660A (reference numeral 26). The associated camber lines 25 and 27 are also represented. Also in this case, the camber line 25 of the RE-W-70-B9 is disposed beneath the chord 18, toward the pressure side 8, and the camber line 27 of the FX 79-W-660A of the prior art is disposed above the chord 18, toward the suction side 7. The profile 24 has a relative profile depth of 70% at a profile depth of 47.7%. A minimum, or, in respect of amount, maximum, camber, of 1.4%, is provided at a profile depth of 39.9%. The maximum positive camber is 1.18% at 85% profile depth. The nose radius is 23.87%. The blunt trailing edge 11 has a thickness of from 50% to 60% of the chord length.

In the case of the profile 26 according to the prior art, there is a relative profile thickness of 66.4% at a profile depth of 46.7%. There is a maximum camber of 2.2% at a profile depth of 17.1%. The nose radius is 4.1%.

Figure 4:
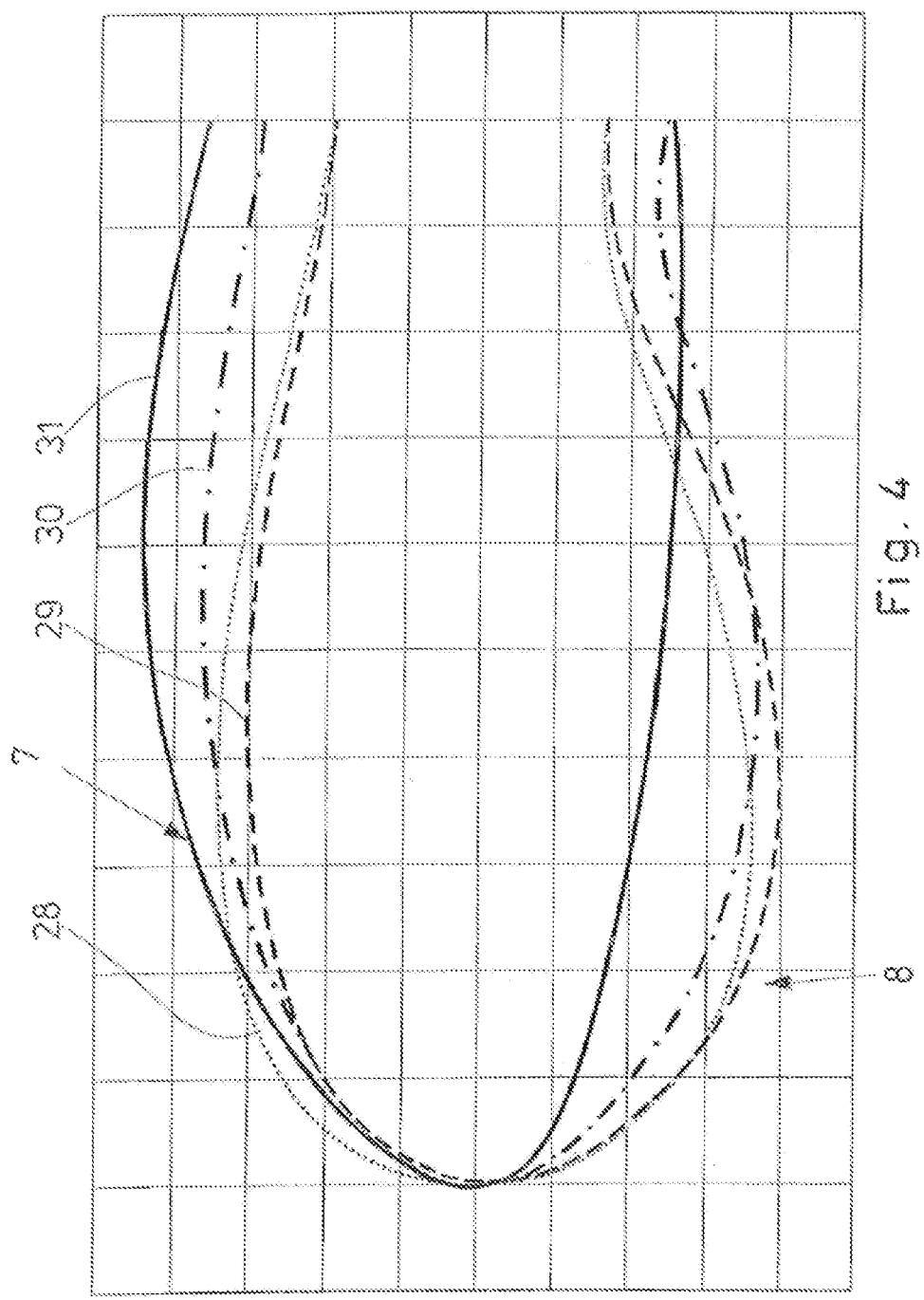
FIG. 4, which is a profile of the prior art in comparison with three profiles for a rotor blade according to the invention.

FIG. 4 shows four further profiles of a rotor blade 5 of a wind turbine, wherein the profiles 28, 29 and 30 are profiles of a rotor blade 5 according to the invention, and one profile, namely, the profile 31, is a profile of the prior art.

The profile 31 corresponds to the FX 77-W-700 from the prior art. The latter is to be realized, for example, on the basis of the Dieter Althaus document, "Niedriggeschwindigkeitsprofile", cited above, such that the profile FX 77-W-500, which is specified on pages 162 and 163, is further truncated at the rear, such that a relative thickness, or relative profile thickness, of 70% is obtained. Naturally, the latter is located at a profile depth that is relatively far back, in this case at approximately 68%.

The profile 28, corresponding to RE-W-70-A1, the profile 29, corresponding to RE-W-70-A2, and the profile 30, corresponding to RE-W-70-B1, also have a relative profile thickness of 70%, with a position of maximum thickness at approximately 34% for the profile 28, approximately 37% for the profile 29, and approximately 50% for the profile 30. Here, also, it can be seen, in the case of the profiles 28 to 30, that concave contours, which, in particular, are more pronounced on the pressure side 8, are provided toward the trailing edge of the profile. The blunt trailing edges 11 have an extent of from 25% to 39% of the chord length.

Figure 3:
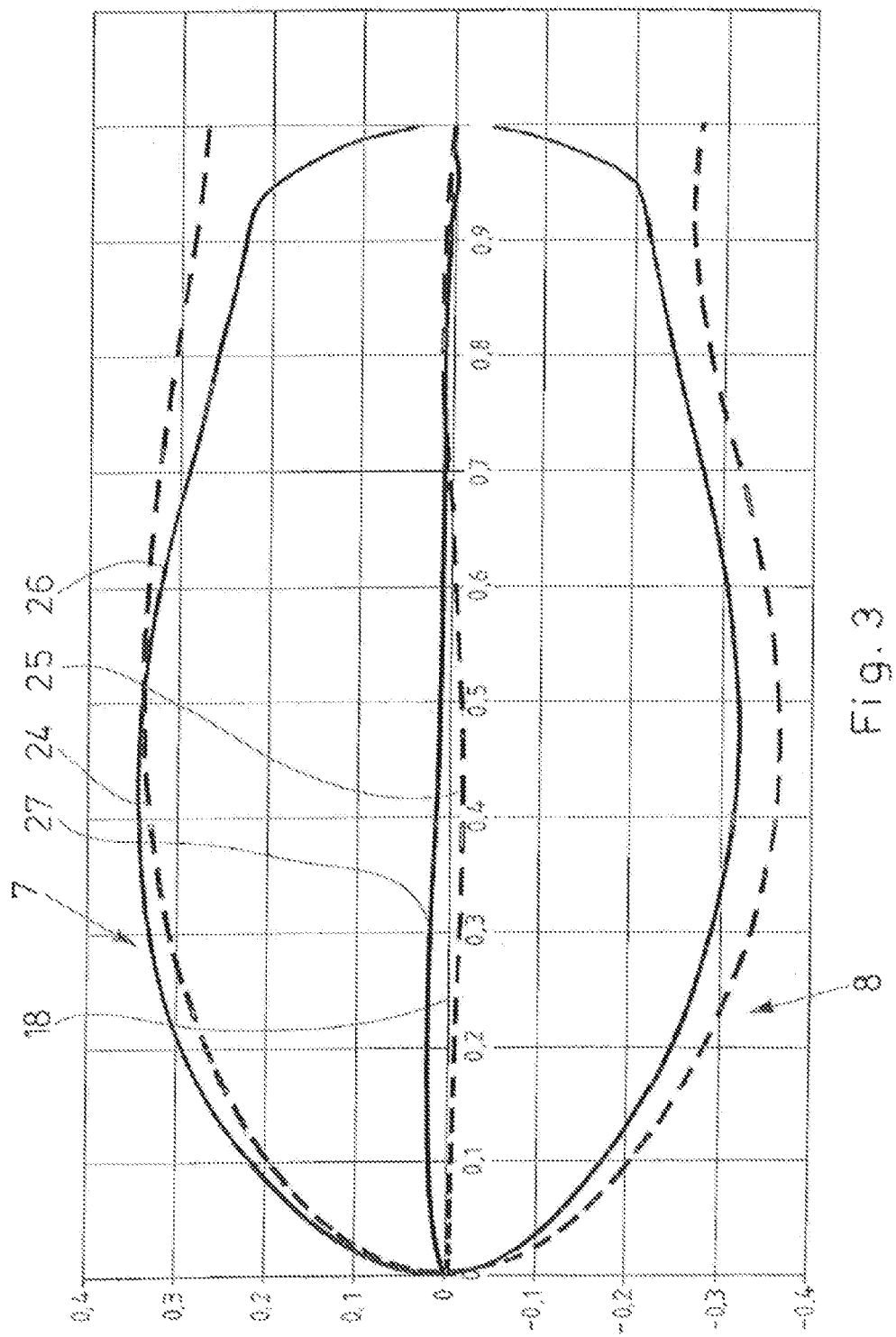
FIG. 3, which is a further profile of a rotor blade according to the invention in comparison with a further profile of the prior art.

The aforementioned represented profiles of FIGS. 2, 3 and 4 are profiles that are represented without vortex generators. According to the invention, the profiles that have prefixes "RE-W" and are correspondingly designed to generate maximum performances in the aerodynamic sense, i.e. in particular very high lift coefficients, in particular both in the case of turbulent and laminar flow, and this being with correspondingly good lift/drag ratios, are now provided, according to the invention, with at least one vortex generator, preferably a plurality of vortex generators, this being on the suction side 7 of the rotor blade, in order to improve yet further the properties of the rotor blade. An unexpected synergy effect is thereby produced since, as a result of this, exceptionally large lift coefficients are achieved, which are otherwise only achieved with corresponding flaps in high-lift systems in the case of aircraft airfoils. The particularly good properties ensue, in particular, from a combination of the relatively thick profiles with the vortex generators. Particularly preferred is the provision of the correspondingly thick, blunt trailing edges already described above. In addition, preferably, a negative camber line is provided, and in addition, preferably, concave portions are provided in the rear region of the profiles of the rotor blade, on the pressure side and, in particular, also on the suction side. A negative camber line means, in particular, a camber line having a portionally negative camber. The camber line is preferably S-shaped, being negatively cambered in the front portion of the profile and positively cambered in the rear portion.

The following profile polars of FIGS. 5 to 8 are profile polars of profiles that were calculated without vortex generators. With vortex generators, different profile polars would be obtained, as is also shown in the following.

Figure 5:
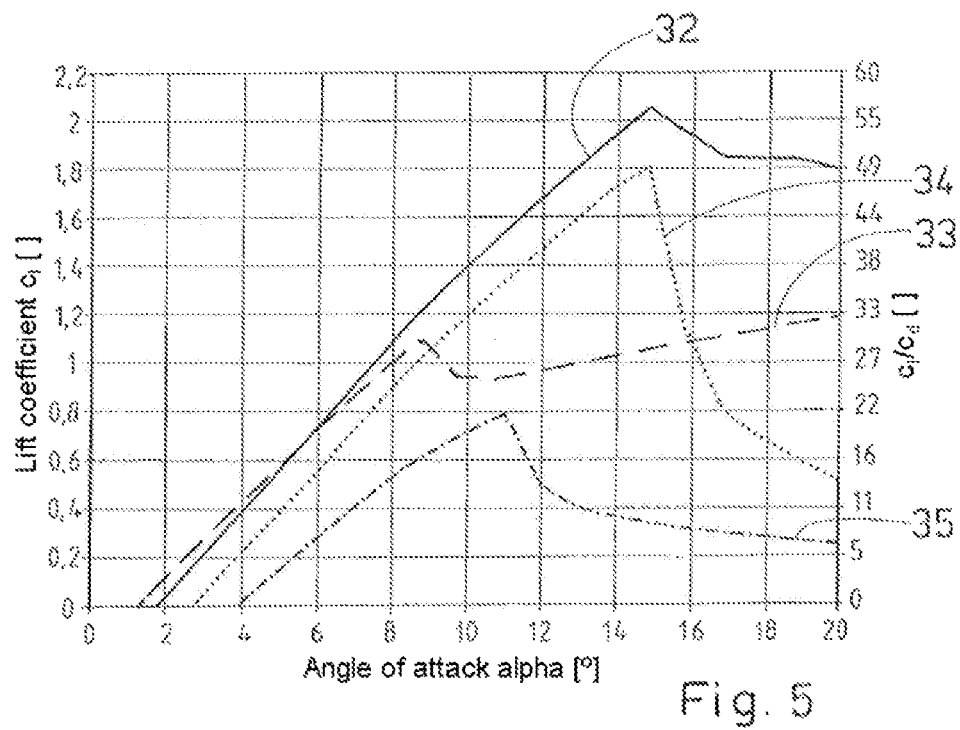
FIG. 5, which is a schematic diagram relating to calculated profile polars of a profile of a rotor blade without a vortex generator.

FIG. 5 shows a schematic diagram relating to calculated profile polars of a profile of a rotor blade according to the invention without a vortex generator, namely, the RE-W-70-B9. The diagram shows the lift coefficient cl over the angle of attack α (alpha), and the ratio of the lift coefficient to the drag coefficient cd. This ratio is the lift/drag ratio. The polars of FIG. 5 are a calculation of the profile polars for a Reynolds number of 3 million. Corresponding calculations were performed for a turbulent circumfluent flow and a laminar circumfluent flow. The profile polar 32 represents a calculation of the lift coefficient cl in the case of laminar circumfluent flow, and the profile polar 33 represents the corresponding value in the case of turbulent circumfluent flow. The profile polar for the lift/drag ratio in the case of laminar circumfluent flow is denoted by the reference numeral 34, and correspondingly by the reference numeral 35 in the case of turbulent circumfluent flow. It can be seen that the lift coefficient has a maximum at approximately 14.8° of the angle of attack, this being in the case of laminar circumfluent flow, and has a maximum at approximately 9° in the case of turbulent circumfluent flow. The lift/drag ratio also has a maximum at approximately 14.8° in the case of laminar circumfluent flow and at approximately 11° in the case of turbulent circumfluent flow.

Figure 6:
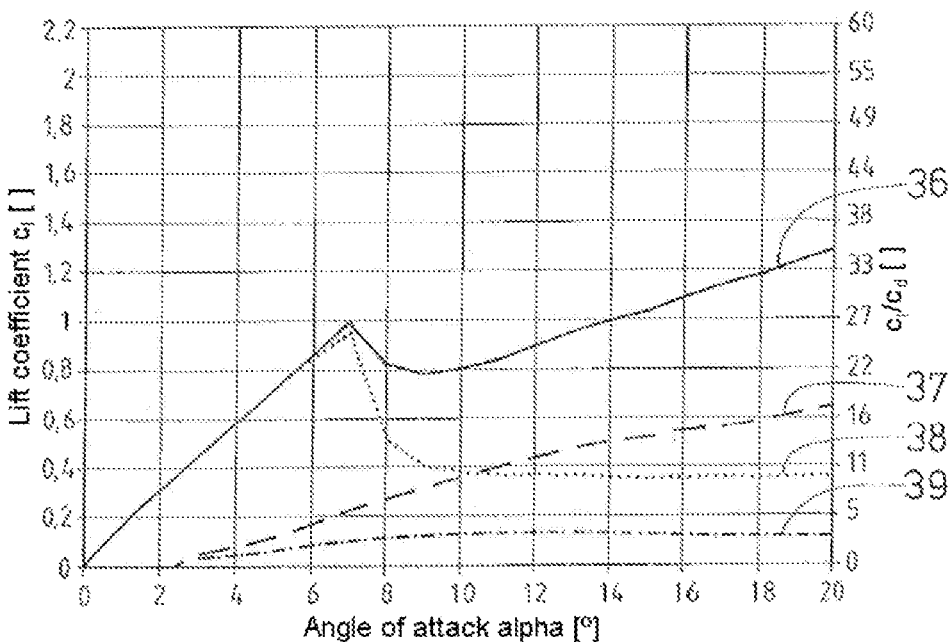
FIG. 6, which is a schematic diagram relating to calculated profile polars of a profile of the prior art.

As a comparison with the corresponding profile polars of a profile according to FIG. 5, FIG. 6 gives the corresponding profile pairs 36, 37, 38 and 39 of a known profile, namely, of the FX 79-W-660 A. It can be seen, in particular, that there is a local maximum of the lift coefficient in the case of the profile polars 36, for laminar circumfluent flow, at approximately 7°, and in the case of a profile polar relating to the lift/drag ratio, in the case of laminar circumfluent flow, which is denoted by the reference numeral 38, there is also a corresponding maximum at 7° of the angle of attack α.

In the case of turbulent circumfluent flow, the profile polar 37, which also relates to the lift coefficient cl, indicates clearly that the lift has been significantly minimized. The same also applies to the profile polar 39 relating to the lift/drag ratio in the case of turbulent circumfluent flow.

Figure 7:
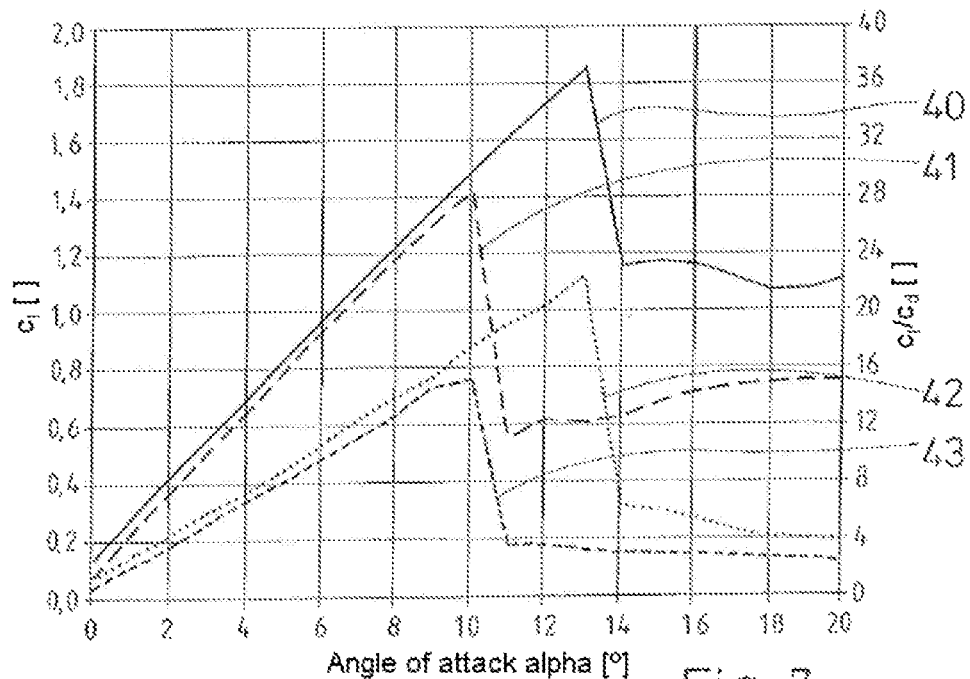
FIG. 7, which is a schematic diagram of measured profile polars of a profile of a rotor blade without a vortex generator.

FIG. 7 shows a schematic diagram of measured profile polars of a profile of a rotor blade without a vortex generator, according to the invention, namely, the profile RE-W-50-B6, which has already been represented in FIG. 2. The profile polar 40 represents the lift coefficient, in the case of laminar circumfluent flow, for a Reynolds number of 3 million. A maximum lift coefficient of approximately 1.84 is attained at an angle of approximately 13°.

It is clearly evident that, even in the case of turbulent circumfluent flow, according to the profile polar 41, the lift coefficient is only slightly reduced. There is a maximum of 1.4 for an angle of attack, or angle of incident flow, a of approximately 10°. Here, the Reynolds number during the measurement was 3.1 million. The profile polar 42 relating to the lift/drag ratio (cl/cd), in the case of laminar circumfluent flow, has a maximum with the angle of attack of approximately 13°. The quotient here is approximately 22. In the case of turbulent circumfluent flow, the maximum lift/drag ratio decreases, according to the profile polar 43, to 15.5 for an angle of attack of approximately 10°.

Figure 8:
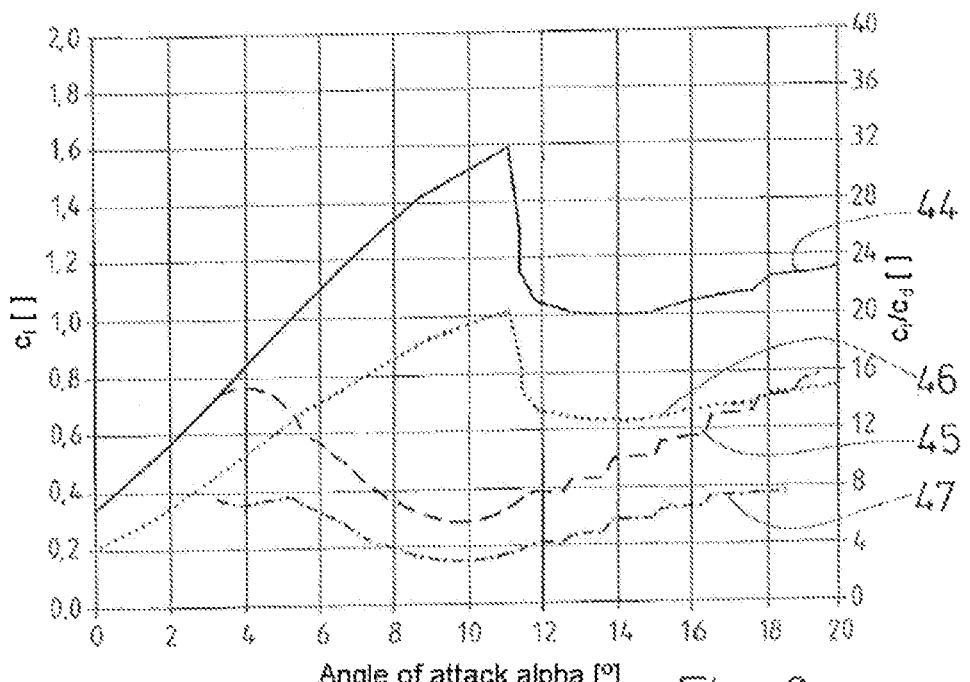
FIG. 8, which is a schematic diagram of measured profile polars of a profile of the prior art.

For comparison, FIG. 8 shows a corresponding schematic diagram, which represents measured profile polars of a profile of the prior art, namely, the profile FX 77-W-500. In comparison with the profile polars of the lift coefficient cl 44, in the case of laminar circumfluent flow, and the profile polar 46 relating to the lift/drag ratio in the case of laminar circumfluent flow, which, per se, already have less favorable values than according to the invention in the case of laminar circumfluent flow, the profile polars collapse entirely in the case of turbulent circumfluent flow. Thus, here also, the measured profile polar for the lift coefficient cl in the case of turbulent circumfluent flow is denoted by 45, and the corresponding measured profile polar 47 relating to the lift/drag ratio is also represented for turbulent circumfluent flow.

Figure 9:
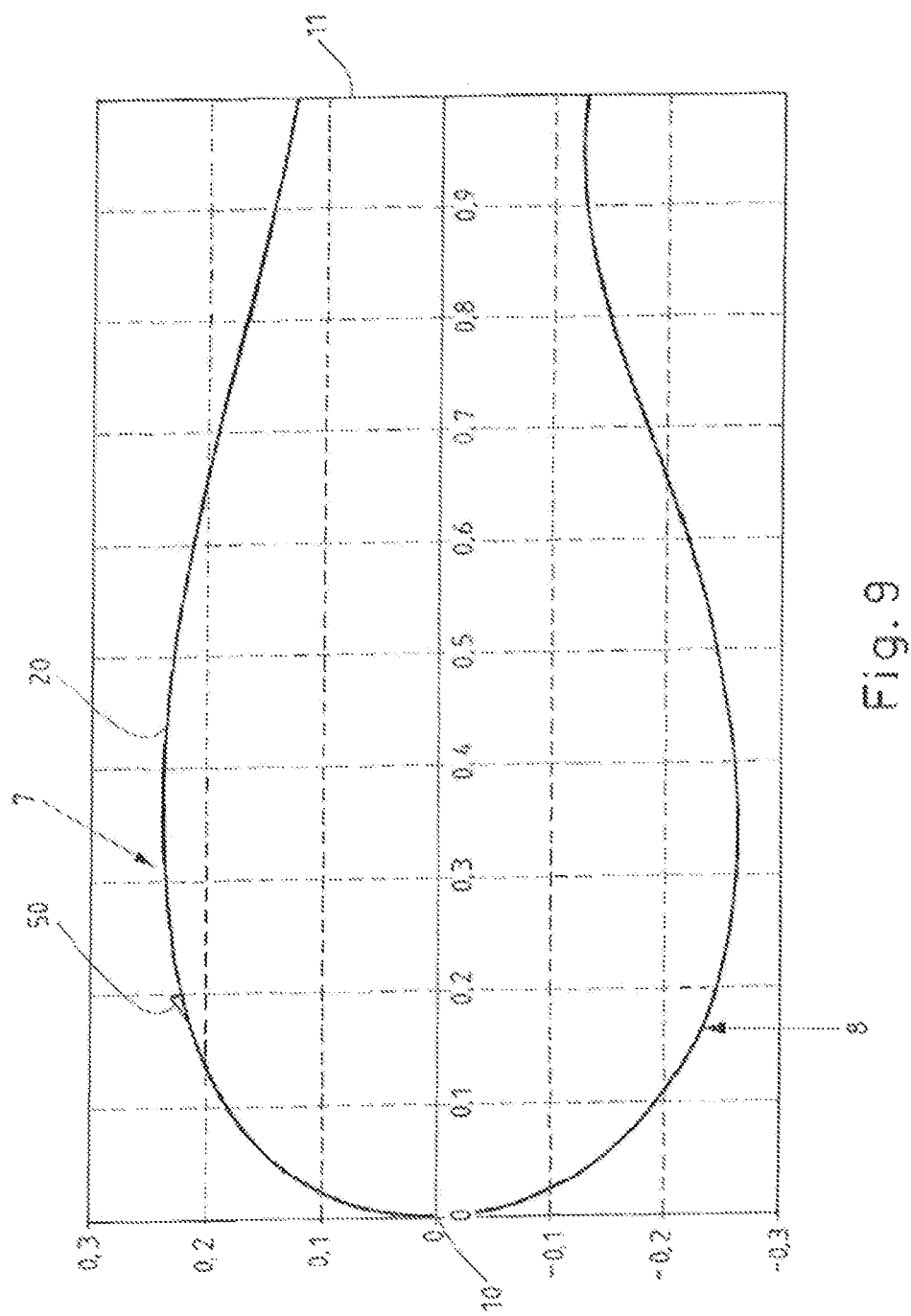
FIG. 9, which is a profile of a rotor blade according to the invention having a vortex generator, in a schematic representation.
Figure 10:
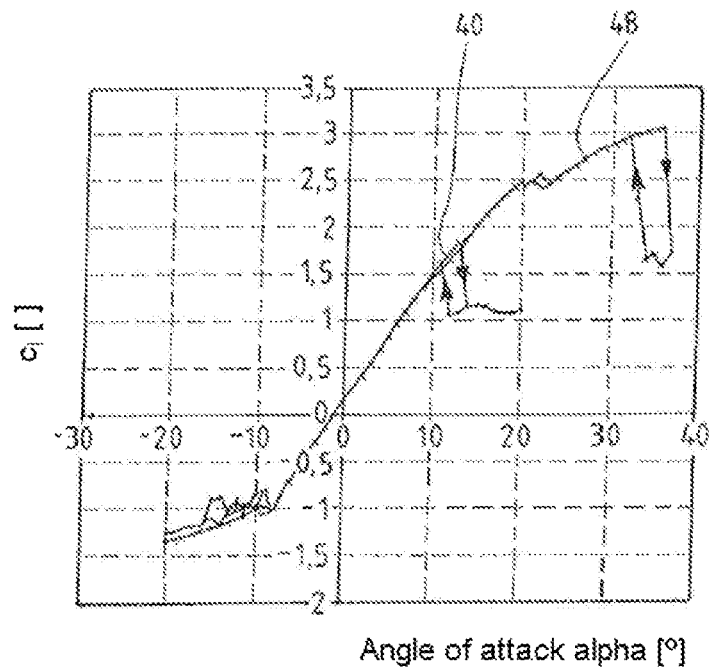
FIG. 10, which is a schematic diagram of profile polars of a profile of a rotor blade according to the invention having a vortex generator, and of a profile of a rotor blade without a vortex generator.

Shown schematically in FIG. 9 is a profile of a rotor blade 5 according to the invention. The profile 20 corresponds to a profile RW-W-50-B6 of the applicant. There is a vortex generator 50 provided on the suction side 7, at approximately 19.5% or 20% of the chord length, measured from the leading edge 10. The shown profile 20 corresponds approximately to the profile 20 from FIG. 2, apart from the fact that a vortex generator 50 has been added in FIG. 9. This vortex generator 50 is now the cause of a significantly increased lift coefficient, as shown schematically in FIG. 10. In FIG. 10, the reference numeral 40 denotes a profile polar of the profile from FIG. 2, namely, the profile 20 shown therein, having the designation RE-W-50-B6. As can be seen, the profile polar runs from the angle of attack of −20° to almost +40°. The profile polar 40 of the profile 20 of the RE-W-50-B6 comes as far as a lift coefficient cl of 1.8, and then collapses at an angle of attack of 13°. There ensues here a corresponding hysteresis behavior, as this is known per se, as is also indicated by the arrows.

Provision of the vortex generator 50 according to FIG. 9, the trailing edge of which is disposed at 20% of the chord length, measured from the leading edge 10, improves the lift coefficient in such a way that the lift coefficient collapses only at an angle of attack of 36°. At this angle, a lift coefficient cl of over 3 is achieved. Here, the polar is denoted correspondingly by the reference numeral 48. This very great improvement in the lift coefficient is an entirely unexpected result for the experts concerned.

Figure 11:
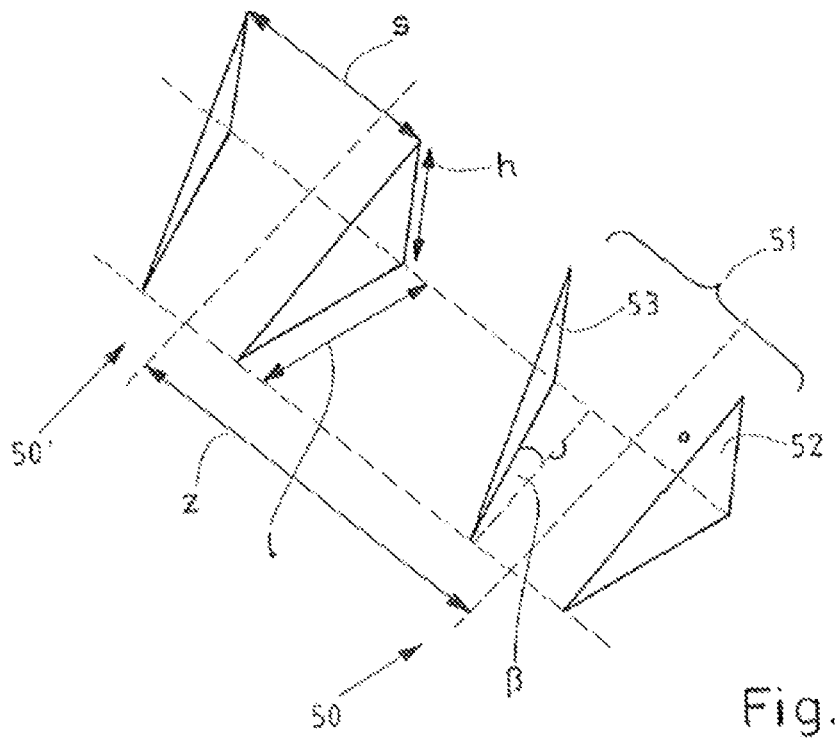
FIG. 11, which is a schematic representation of two vortex generators.

FIG. 11 shows, again in corresponding schematic manner, two vortex generators 50 and 50' in corresponding arrangements and orientations. The fins 52 and 53 of the pair of fins 51 of the vortex generator 50 and also, correspondingly, of the vortex generator 50', are disposed, relative to an intersecting plane of a profile, at an angle β in the case of the fin 53 and at an angle −β in the case of the fin 52. The two fins 52, 53 of the pair of fins 51 of the vortex generator 50 converge forwardly to the leading edge 10 of the profile, or of the rotor blade, at an angle of 2β in relation to each other. Owing to this design, mutually mirrored eddies, which enable a particularly high lift coefficient to be achieved, are generated by each fin 52, 53. The height h of the respective fin 52, 53 corresponds approximately to the height of the boundary layer that is generated by the friction at the surface of the rotor blade, thus approximately 2 cm to 6 cm. The length l corresponds to 1.5 to 4 times the height h, a length of 2.5 h, in particular, being preferred. The spacing s of the fins 52, 53 is preferably between 1.5 and 5 h, in particular preferably 3 h. The spacing of the pair of fins 51, or of the vortex generators 50, 50' in relation to each other is in the range of between 3 and 9 h, preferably being 6 h.

All stated features, including the features given solely by the drawings and also individual features that are disclosed in combination with other features, are considered to be material of the invention, both singly and in combination. Embodiments according to the invention may be fulfilled by individual features or a combination of a plurality of features.

LIST OF REFERENCE NUMBERS USED IN THE ACCOMPANYING DRAWING FIGURES 1-4 profile
5 rotor blade
6 profile
7 suction side
8 pressure side
10 leading edge
11 trailing edge
12 blade root
13 transition region
18 chord
20 profile RE-W-50-B6
21 camber line of RE-W-50-B6
22 profile FX 83-W-500
23 camber line of FX 83-W-500
24 profile RE-W-70-B9
25 camber line of RE-W-70-B9
26 profile FX 79-W-660 A
27 camber line of FX 79-W-660A
28 profile RE-W-70-A1
29 profile RE-W-70-A2
30 profile RE-W-70-B1
31 profile FX 77-W-700
32 profile polar cl laminar
33 profile polar cl turbulent
34 profile polar cl/cd laminar
35 profile polar cl/cd turbulent
36 profile polar cl laminar
37 profile polar cl turbulent
38 profile polar cl/cd laminar
39 profile polar ca/cd turbulent
40 profile polar cl laminar
41 profile polar cl turbulent
42 profile polar cl/cd laminar
43 profile polar cl/cd turbulent
44 profile polar cl laminar
45 profile polar cl turbulent
46 profile polar cl/cd laminar
47 profile polar cl/cd turbulent
48 profile polar cl laminar
50, 50', 50'', 50''' vortex generator
51 pair of fins
52 fin
53 fin
h height
l length
s fin spacing
z vortex generator spacing

What is claimed is:

1. A rotor blade of a wind turbine, having a profile that has a suction side and a pressure side, wherein the profile comprises a camber line and a chord between a leading edge and a trailing edge of the profile, wherein the profile has a relative profile thickness of more than 49%, wherein at least one vortex generator is disposed on the suction side of the profile in a transition region of the profile where the trailing edge of the profile is blunt and has a thickness of between 15% and 70% of a length of the chord, and wherein the at least one vortex generator has a height that is equal to or less than a height of an air boundary layer that forms on the suction side of the rotor blade when the rotor blade is in operation, said air boundary layer being a layer of air having an air speed that is reduced by at least 1% relative to ambient air speed as a result of friction on a rotor blade surface on the suction side.

2. The rotor blade as claimed in claim 1, wherein the camber line extends, at least in part beneath the chord, in a direction of the pressure side.

3. The rotor blade as claimed in claim 1, wherein the at least one vortex generator is disposed in a range of from 5% to 40% of chord length.

4. The rotor blade as claimed in claim 1, wherein the at least one vortex generator comprises a pair of fins, wherein the fins of the pair of fins are disposed at an angle in relation to each other that is in a range of from 10° to 50°.

5. The rotor blade as claimed in claim 1, wherein a plurality of vortex generators are provided, which are disposed next to each other, substantially parallel to a longitudinal axis of the rotor blade.

6. The rotor blade as claimed in claim 5, wherein all of the plurality of vortex generators are disposed at a relative profile depth of 20% to 40% as viewed from the leading edge.

7. The rotor blade as claimed in claim 1, wherein the camber line is disposed in a portion between 0% and 60% of the profile depth of the profile beneath the chord.

8. The rotor blade as claimed in claim 1, wherein the camber line is disposed entirely in a portion between 5% and 50% beneath the chord.

9. The rotor blade as claimed in claim 1, wherein an amount of maximum camber is less than 1.5%.

10. The rotor blade as claimed in claim 1, wherein a second derivative of the camber line is either 0 or positive from 10% to 40% of a profile depth.

11. The rotor blade as claimed in claim 1, wherein a position of maximum thickness is less than 35% of the chord length.

12. The rotor blade as claimed in claim 1, wherein the relative profile thickness is more than 65%.

13. The rotor blade as claimed in claim 1, wherein a nose radius is provided that is greater than 18% of a profile depth, and wherein the profile is asymmetrical in the nose region.

14. The rotor blade as claimed in claim 1, wherein the suction side and the pressure side of the profile each have a concave contour, at least in a region from 70% to 100% of the chord length measured from the leading edge.

* * * * *